(12) United States Patent
Kochsiek (10) Patent No.: US 11,359,675 B2
(45) Date of Patent: Jun. 14, 2022

(54) SHAFT-HUB CONNECTION

(71) Applicant: Guido Kochsiek, Leopoldshoehe (DE)

(72) Inventor: Guido Kochsiek, Leopoldshoehe (DE)

( * ) Notice: Subject to any disclaimer, the term of this patent is extended or adjusted under 35 U.S.C. 154(b) by 668 days.

(21) Appl. No.: 16/310,943

(22) PCT Filed: Jun. 28, 2017

(86) PCT No.: PCT/EP2017/065968
§ 371 (c)(1),
(2) Date: Dec. 18, 2018

(87) PCT Pub. No.: WO2018/002122
PCT Pub. Date: Jan. 4, 2018

(65) Prior Publication Data
US 2020/0141449 A1    May 7, 2020

(30) Foreign Application Priority Data
Jun. 28, 2016  (EP) .................... 16176697

(51) Int. Cl.
*F16D 1/10* (2006.01)

(52) U.S. Cl.
CPC .......... *F16D 1/10* (2013.01); *F16D 2001/103* (2013.01); *Y10T 403/7035* (2015.01)

(58) Field of Classification Search
CPC ... F16D 1/06; F16D 1/10; F16D 1/101; F16D 2001/102; F16D 2001/103; Y10T 403/7026; Y10T 403/7028; Y10T 403/7031; Y10T 403/7032; Y10T 403/7033; Y10T 403/7035
USPC .......................................... 403/359.1–359.6
See application file for complete search history.

(56) References Cited

U.S. PATENT DOCUMENTS

| | | | | |
|---|---|---|---|---|
| 2,015,430 A * | 9/1935 | Matthews | ................. | F16D 1/06 403/359.6 |
| 2,248,695 A * | 7/1941 | Bradshaw | ........... | F16B 23/0007 411/410 |
| 4,302,047 A * | 11/1981 | Esser | ................... | B60N 2/2252 297/362 |
| 4,357,137 A * | 11/1982 | Brown | .................... | F16D 1/101 464/75 |
| 4,827,800 A * | 5/1989 | Pedersen | ................... | F16D 1/06 403/359.6 |
| 4,838,832 A * | 6/1989 | Schmitt | ..................... | F16D 1/06 403/359.6 |
| 6,623,202 B2 * | 9/2003 | Hansson | ............... | B23B 31/008 403/359.6 |
| 6,702,508 B2 * | 3/2004 | Simons | .................. | F16D 1/101 403/359.2 |
| 8,291,795 B2 * | 10/2012 | Hughes | .............. | F16B 23/0038 81/460 |

(Continued)

FOREIGN PATENT DOCUMENTS

| | | | | |
|---|---|---|---|---|
| DE | 10049975 A1 * | 5/2002 | .............. | F16D 1/10 |
| DE | 102004004456 A1 | 6/2005 | | |

(Continued)

*Primary Examiner* — Josh Skroupa
(74) *Attorney, Agent, or Firm* — Harness, Dickey & Pierce, P.L.C.

(57) ABSTRACT

A shaft-hub connection includes an alignment gearing with a plurality of dogs. The dogs comprise a contouring cross-section, which runs, at least partially, along a prolonged trochoid.

9 Claims, 7 Drawing Sheets

(56) References Cited

U.S. PATENT DOCUMENTS

| | | | | |
|---|---|---|---|---|
| 8,690,473 | B2 * | 4/2014 | Padmanabhan | F16D 1/101 |
| | | | | 403/359.6 |
| 8,740,533 | B2 * | 6/2014 | Gaillard | B25B 15/005 |
| | | | | 411/403 |
| 9,387,544 | B2 * | 7/2016 | Phebus | F16D 1/10 |
| 9,732,802 | B2 * | 8/2017 | Griffiths | F16D 1/06 |
| 2002/0168222 | A1 | 11/2002 | Simons et al. | |
| 2003/0059233 | A1 | 3/2003 | Jang et al. | |
| 2012/0279813 | A1 | 11/2012 | Kochsiek | |

FOREIGN PATENT DOCUMENTS

| | | | | |
|---|---|---|---|---|
| DE | 102004056642 A1 | | 6/2006 | |
| DE | 102008019263 A1 | * | 10/2009 | F16D 1/108 |
| DE | 102009056075 A1 | | 6/2011 | |
| DE | 102010055379 A1 | | 6/2012 | |
| DE | 102012202518 A1 | * | 8/2013 | F16D 1/101 |
| DE | 202016102524 U1 | | 8/2016 | |
| DE | 102016223357 A1 | * | 5/2018 | F16D 1/10 |
| EP | 1225356 A1 | | 7/2002 | |
| FR | 2406750 A1 | | 5/1979 | |
| JP | 2012021594 A | * | 2/2012 | F16D 1/10 |
| WO | WO-2006015648 A1 | * | 2/2006 | F16D 1/10 |
| WO | WO-2012/152442 A1 | | 11/2012 | |
| WO | WO-2013152386 A1 | * | 10/2013 | F16D 1/101 |

* cited by examiner

Fig. 1

Prior Art

Fig. 2

Prior Art

SHAFT-HUB CONNECTION

CROSS-REFERENCE TO RELATED APPLICATIONS

This application is a National Stage of International Application No. PCT/EP2017/065968 filed on Jun. 28, 2017. This application claims the priority to European Patent Application No. 16176697.7, filed on Jun. 28, 2016. The entire disclosures of the above applications are incorporated herein by reference.

FIELD

The present disclosure relates to a shaft-hub connection comprising an alignment gearing.

BACKGROUND

This section provides background information related to the present disclosure which is not necessarily prior art.

Such shaft-hub connections are widely known and used in the state of the art. An alignment gearing is a multiple drive-type fastening. The torques are usually transmitted by means of the toothed flanks. The outside of the shaft is toothed and the inside of the hub is toothed. Dogs project from the outside of the shaft and from the inside of the hub. Corresponding recesses are formed on the respectively opposite element. There are interspaces between the dogs, which interspaces will be filled out by the material of the opposite element.

Such alignment gearings are known as involute gearings, parallel tooth systems or fine serrations, depending on the formation and the contour of the teeth.

In usual shaft-hub connections feather key plug-in toothing connections, round crimping connections or other connections comprising intermediate elements are widely used. The use of the intermediate elements shall assure the contact contour required for the torque transmission. Other fitting connections known in the state of the art also know dogs having polygonal outer contours, to which belong for example the so-called H or P3G profiles. In particular in case of high loads and big structural parts considerable disadvantages will be found. The connections comprise a full-surface form-fit. The power transmission takes place at every point of the contour normal, i.e. perpendicularly to the surface normal. In an ideal manner and particularly in case of heavy loads, the load transfer angle should be tangential with respect to the centre of the structural components. But this is not the case for the known polygon shapes. Furthermore, polygon shapes of dogs are difficult or complicate to manufacture.

SUMMARY

This section provides a general summary of the disclosure, and is not a comprehensive disclosure of its full scope or all of its features.

Based upon the above described state of the art it is the object of the present disclosure to provide a shaft-hub connection which doesn't require any additional transmission elements or intermediate elements, assures a better position of the load transfer angle and can be manufactured economically with the required quality and precision.

For the technical solution of this problem a shaft-hub connection having the features of claim 1 is proposed. Other advantages and features will become apparent from the sub-claims.

According to the disclosure, the dogs comprise a contour in cross section, which contour extends at least partially along a prolonged trochoid.

The dogs comprise a contour in cross section, i.e. an extension of the contour which thus runs, at least in places or partially, along a prolonged trochoid.

A shaft-hub connection in the sense of the present disclosure comprises any connection between an inner and an outer structural component for the purpose of torque transmission. These connections also include disk-shaped hubs, such as for example general clutches, multi-plate clutches, brake disks connections in the field of wind power technology, connections between a ship's propeller and a drive shaft as well as other connection assemblies.

A cycloid, which is also called cyclic curve, is a path followed by a circle point during the rolling of a circle on a guiding curve. The guiding curve can be for example a straight line or also a circle. Like this, for example hypocycloids or epicycloids and also hypotrochoids or epitrochoids are generated. The typical hypocycloid or hypotrochoid is generated by a point P of a circle having the radius R, which point rolls on the inner side of another circle without slipping. The typical epicycloid or epitrochoid is generated by a point P of a circle, which point rolls on the outer side of another circle without slipping. The distance a between the point P and the centre of the radius R is important. If the distance a does not equal the radius R, one speaks of trochoids, otherwise one speaks of a usual cycloid. If a is smaller than R, one speaks of shortened trochoids. If a is larger than R, one speaks of prolonged trochoids.

Prolonged trochoids are characterized by their discontinuous form, i.e. the curves intersect with each other during the curve progression. While the state of the art describes closed cycloids with respect to the type of the connection contour, the disclosure refers to subparts or sections of the respective prolonged trochoids which form a connector cross section between the shaft and the hub. Thanks to the use of prolonged trochoids, the force transmission of torque transmissions will be clearly improved in comparison to other cycloid types. It is in particular possible to create a steeper dog shape. In this way it is possible to produce especially stable and efficient connections. The use of corresponding manufacturing processes does not only enable an economic, but also a highly precise manufacture which only makes it possible to take the use of prolonged trochoids into consideration. The complex machining operation would rather cause the man skilled in the art to avoid such shapes. This refers to narrow curve progressions, abrupt diameter changes and the like.

According to an advantageous proposal, the connection can be configured to be displaceable on the axis or can also be pressed, depending on the application case. It is also possible to adjust and fit in dogs of other contouring, for example if different shaft-hub connections that are placed axially one after the other have to be designed.

Furthermore, it is especially advantageous that the tooth system will be produced by means of out-of-round-turning. This is at least true for one of the parts among shaft or hub, but preferably it is also true for both. Hereby, a particular economic efficiency is obtained also in mass production. Another advantage of the present disclosure is that different materials can be combined with each other. Thanks to the type of the dog contour, an optimum torque transmission takes place without too high forces acting upon the individual dogs.

According to another advantageous proposal of the disclosure, the dog can comprise an undercut. Also other areas which are isolated are comprised within the scope of the disclosure. In the form isolated areas are such ones in which the shaft and the hub are not in contact with each other.

The disclosure enables to produce corresponding shaft-hub connections exclusively by means of turning processes. The contour is generated during the manufacture by means of turning processes and it comprises a high precision with the highest possible pitch and curve shape precision. Pitch errors are practically not measurable.

All dogs can be manufactured according to the same machining process. The shape of all dogs is identical, such that the dimensioning operation is reduced to one dog. Thanks to the mathematically clearly defined contour, the disclosure is suitable for large-scale productions and can be checked by means of a simplified measurement technology.

The force transmission vectors rather point into the circumferential direction and an optimized introduction of the forces for transmitting torques is obtained.

The disclosure allows high degrees of freedom with respect to the construction and manufacture of shaft-hub connections. The number of dogs, the tool flight circle radius and the penetration depth into the workpiece are manufacturing parameters which enable to produce suitable shapes.

In practice certain manufacturing parameters have proven to be suitable. Thus, the number of dogs is comprised within a range of 7 through 70 dogs, wherein 15 through 40 can be considered as typical. The width of the dogs is preferably >8, more preferably >12 mm. Regarding the dog height, >5 mm has proven to be preferable, >8 mm is more preferable. The interspace between the dogs is preferably >3 mm, more preferably >5 mm. These specifications also show that the ratio between dogs and interspace in dependence on constructional space and performance requirement does not necessarily be 1:1. For example 2:1, 2.5:1, but also conversely 1:2, 1:2.5 as well as any intermediate ratios can be suitable.

An undercut can preferably come to several millimetres, provided that one is formed.

In an especially advantageous manner, all the dogs have the same shape.

According to another advantageous proposal of the disclosure, the connection uses less than 50% of the axial area of the overlapping of shaft and hub.

The connection can be respectively adapted to and optimized for each individual case. Apart from the number of the dogs, the width and height thereof, the size of the interspaces between the dogs, the inner and outer functional diameters, the contact areas between the dogs of the shaft and the hub of the connection as well as the undercut can be varied.

The production of the contour by means of turning processes, in particular by means of out-of-round-turning processes leads to a high manufacturing precision with a highest possible pitch accuracy and curve shape precision. Possible pitch errors are not measurable. In this manner, a high uniform contact pattern behaviour is obtained. This means that industrially reproducible connections can be produced, in which the force transmission surfaces are optimum. While previous corresponding shaft-hub connections generate a correspondingly good contact pattern behaviour only after a longer run-in period, this behaviour is practically immediately produced by the present disclosure, which principally increases the efficiency.

The disclosure enables the manufacture of oversize connections (crimping connections), such that different extensions of shaft and hub do not provoke contact losses. The undercut, in which the surface normals advantageously point outwards, assures that the connection cannot lift-off. In case of applying an undercut in push fit connections this one assures that if the shaft and the hub have different extensions, the maximum play in the connection will be limited.

For facilitating the assembly of a shaft with a hub, both in the shaft and in the hub graduated inner or outer contours can be used. For this purpose, at least two steps in the shaft and in the hub are dimensioned such that there will be a clear play in the first axial area of the connection, which highly facilitates the assembling operation. Before the structural components get into contact in the last step, the connection has already centred itself. Both structural components can be assembled with a high oversize without affecting the radial or axial run-out quality. In the finally mounted state the entire connection carries with the oversize defined by the design, i.e. the entire axial length of the connection will be exploited. Thanks to this option and in particular in case of highly stressed connections the constructional space provided for the connection can be optimized, especially if a high oversize is required for the functionality of the connection. Thanks to the graduated design, a heating-up or deep-freezing can be omitted during the assembling operation, which is a considerable advantage.

The disclosure provides a shaft-hub connection that can be manufactured in a highly economic manner and can be used for the most different application cases of torque transmission.

DRAWINGS

The drawings described herein are for illustrative purposes only of selected embodiments and not all possible implementations, and are not intended to limit the scope of the present disclosure.

Other advantages and features of the disclosure will become apparent from the following description by means of the figures. Herein.

In the figures, the same elements are referenced with the same reference numerals.

DETAILED DESCRIPTION

Example embodiments will now be described more fully with reference to the accompanying drawings.

Figure 1:
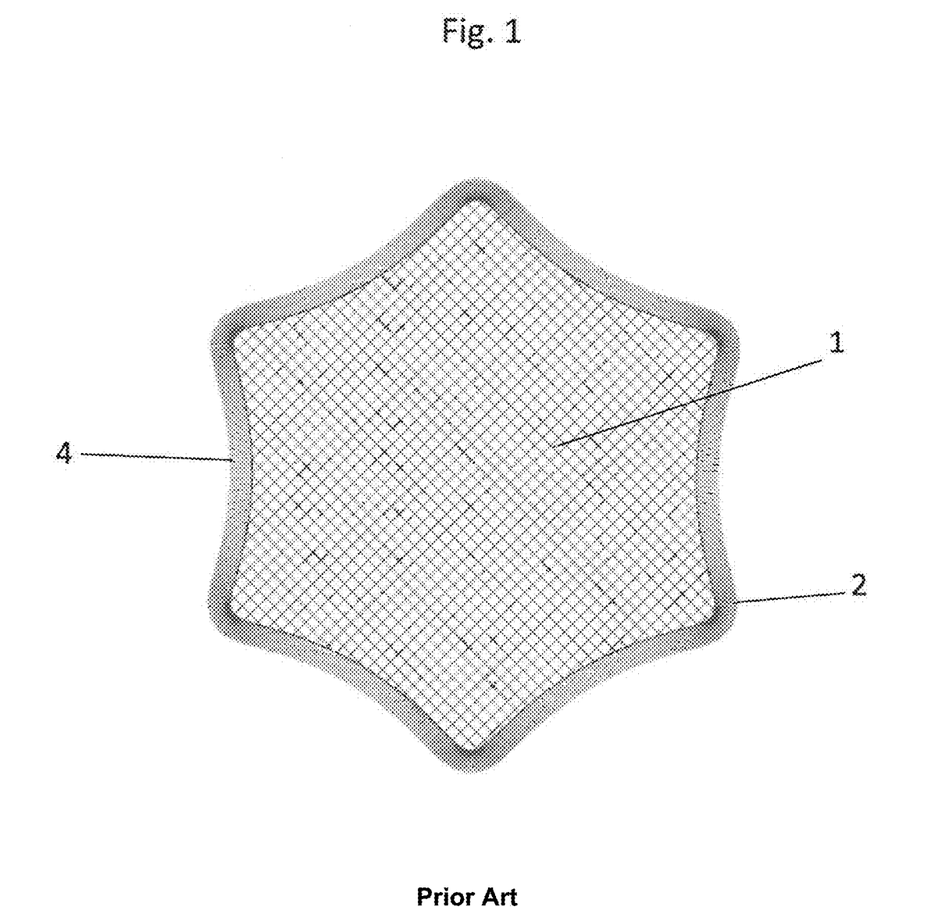
FIG. 1 is a top view of a polygonal profile of a shaft according to the state of the art.
Figure 2:
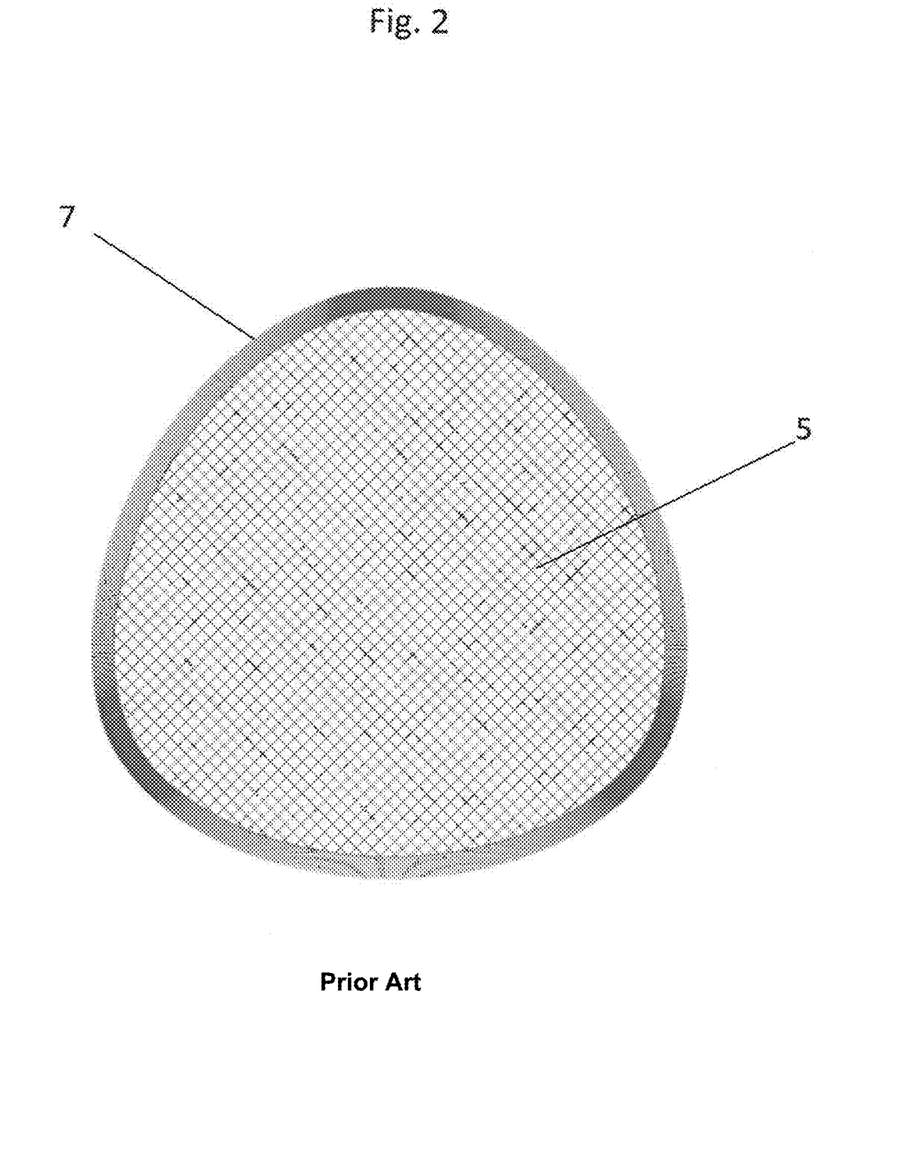
FIG. 2 is a top view of a polygonal profile of a shaft according to the state of the art.

According to the FIGS. 1 and 2 there are, apart from the standard tooth systems known per se, such as involute gearings, parallel tooth systems or fine serrations, also so-called polygonal tooth systems. Polygonal contours such as the shown ones are known in the state of the art. FIG. 1 exemplarily shows a so-called H6 profile 1, in which a contour having six corners 2 is formed. This cross section for the torque transmission comprises the surface normal 4.

According to FIG. 2, a so-called P3G profile is shown, in which the surface normal 7 is formed.

In the FIGS. 1 and 2, the respective normals are represented as extending over the entire circumference. Here, the course of the normals that is partly extremely unfavourable for a force transmission or a torque transmission is in particular revealed.

Figure 3:
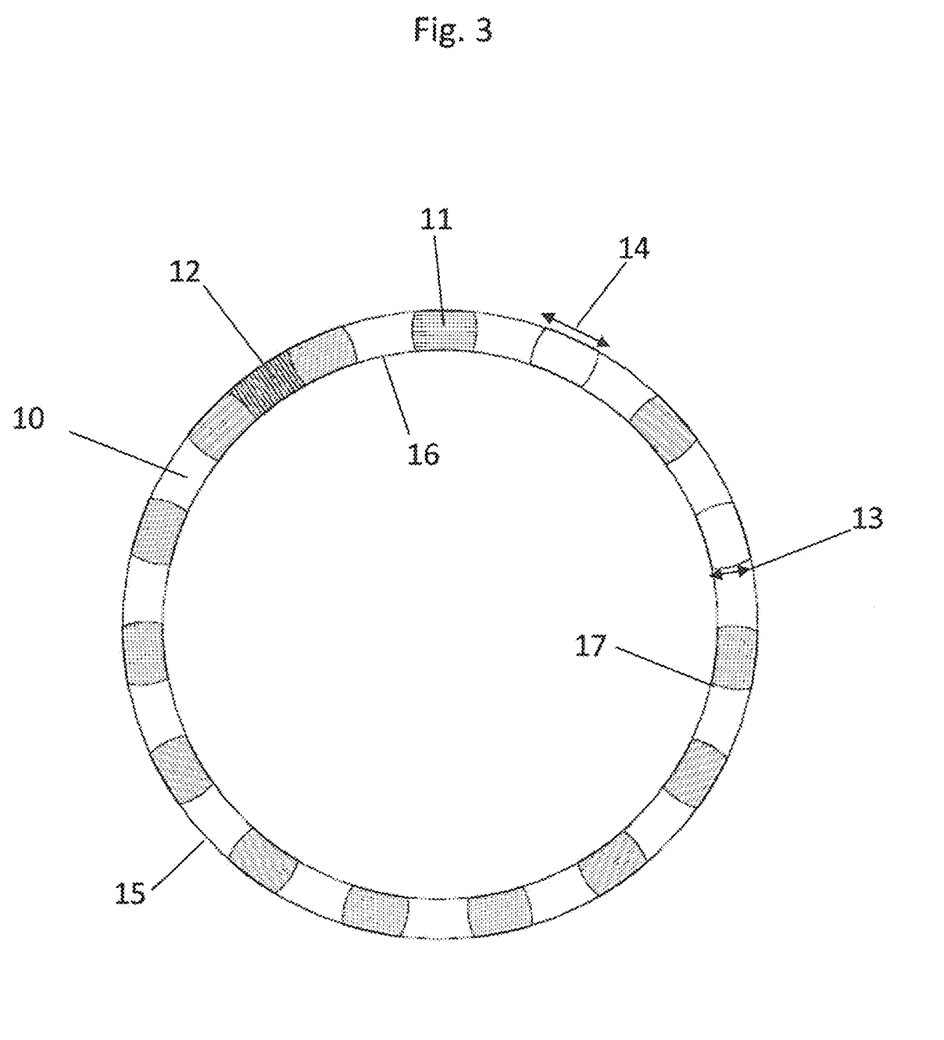
FIG. 3 is a cut view (schematized) of an exemplary embodiment of a shaft-hub profile according to the disclosure.
Figure 4:
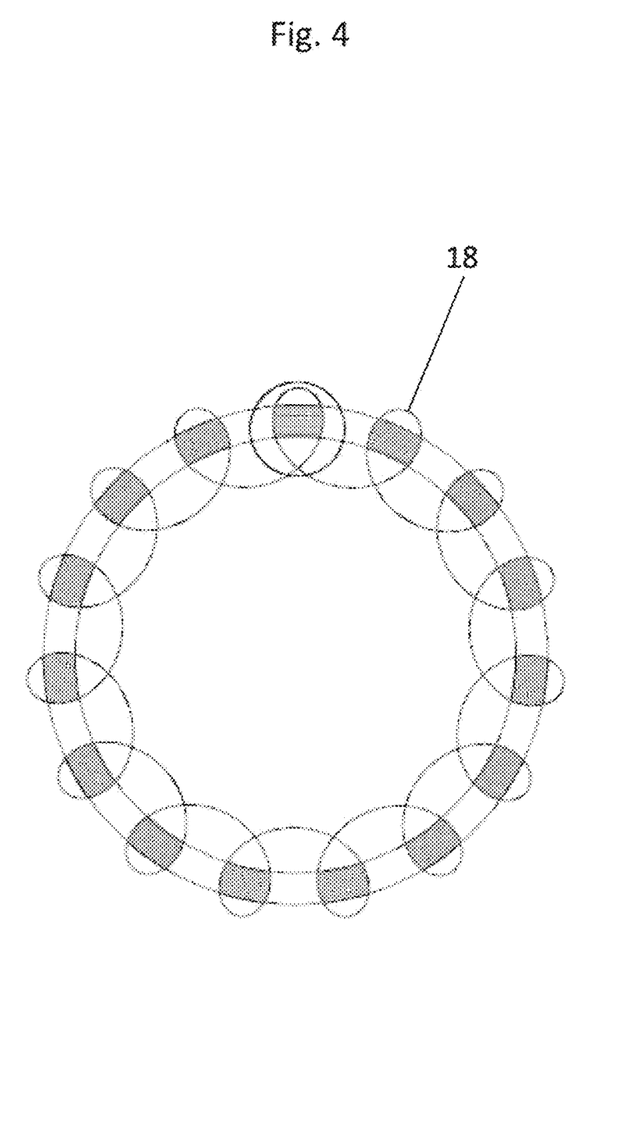
FIG. 4 is a representation according to FIG. 3 with the representation of the tool flight circle.
Figure 5:
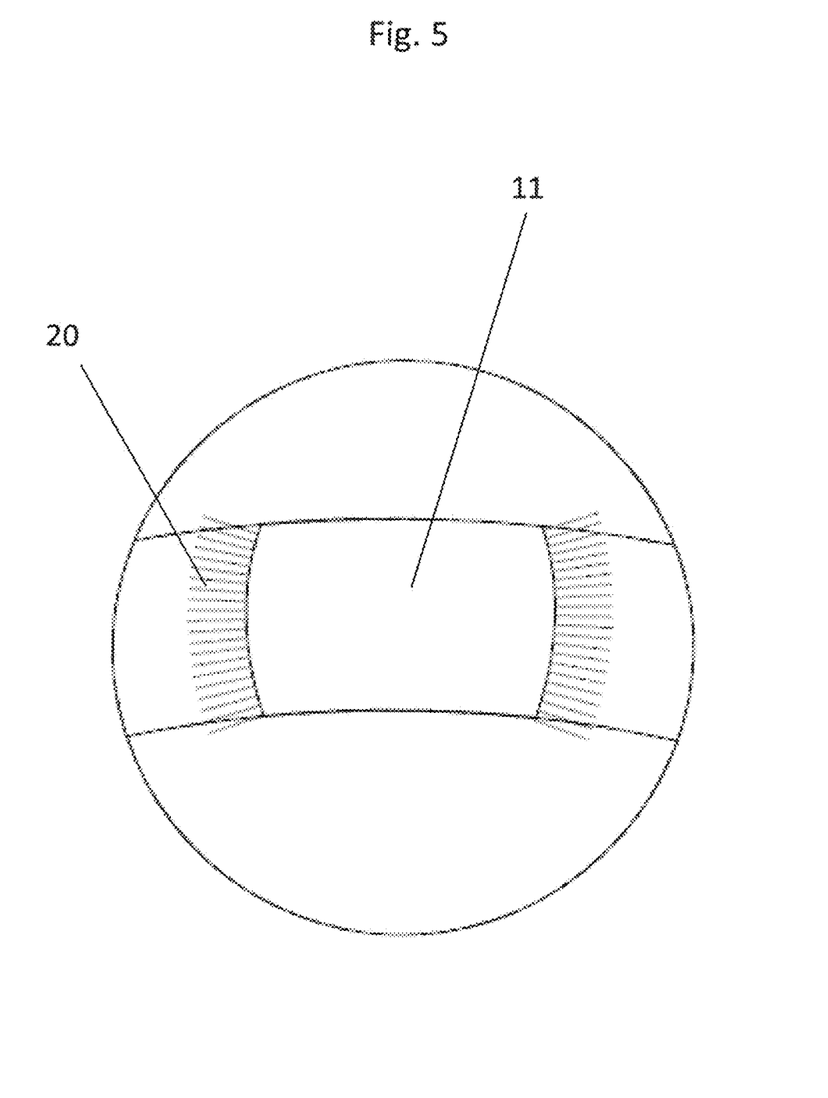
FIG. 5 is an enlarged representation of the normal in an exemplary embodiment of a shaft-hub profile according to the disclosure.

In the FIGS. 3 and 4 an exemplary embodiment of a tooth system profile according to the disclosure is shown. The profile 10 comprises dogs 11 having a dog height 13 and interspaces 12, into which profile 10 engages the corresponding counter-profile. The dogs comprise the dog width 14. They are placed between the inner functional diameter 16 and the outer functional diameter 15. In the shown exemplary embodiment the dogs comprise an undercut 17, wherein this one is a tapering in the area of the root. The tool flight circle 18 is shown in fiaccording to FIG. 3. In the shown enlarged image the dog 11 is complemented by the representation of the normals 20 that are represented by means of corresponding rays on the dog surface. It is shown that the normals extend in a highly favourable manner, whereby a particular suitability for the transmission of forces and torques is obtained.

Figure 6:
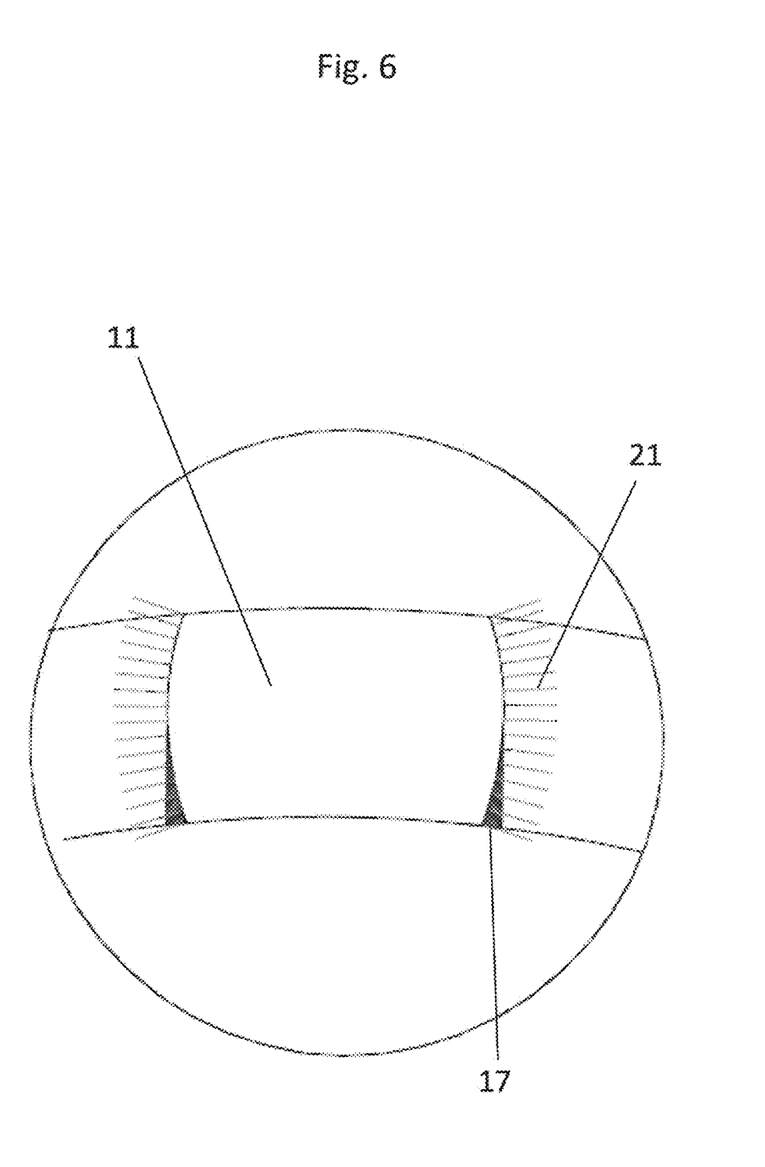
FIG. 6 is a representation according to FIG. 5 of an exemplary embodiment comprising an undercut.

The corresponding representation shown in FIG. 6 shows a dog 11 as well as the radial normals 21. The undercut 17 is especially marked in this representation. It results from the dog's deviation from an at least straight or tangential running-in course. The undercut contour entails the correspondingly described advantages.

Figure 7A:
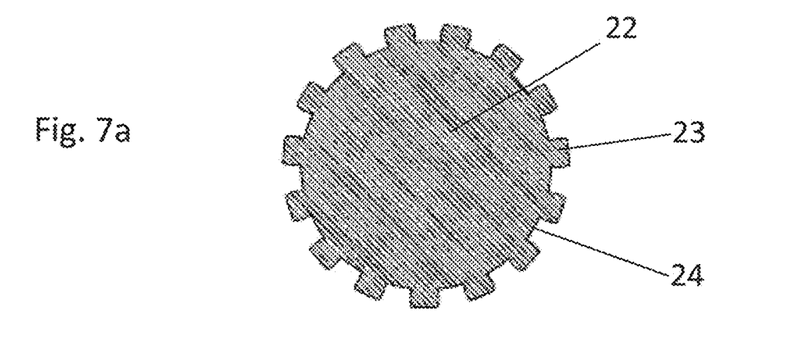
FIG. 7a is a cut view of a shaft according to the disclosure.
Figure 7B:
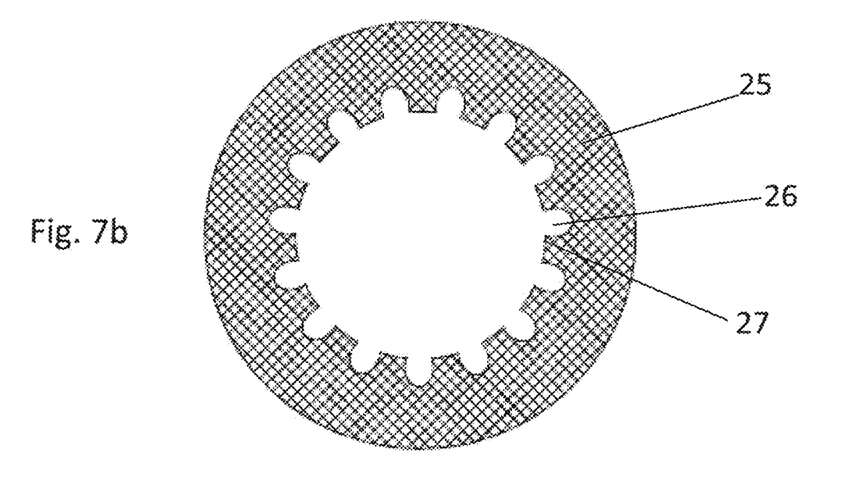
FIG. 7b is a cut view of a hub according to the disclosure.
Figure 7C:
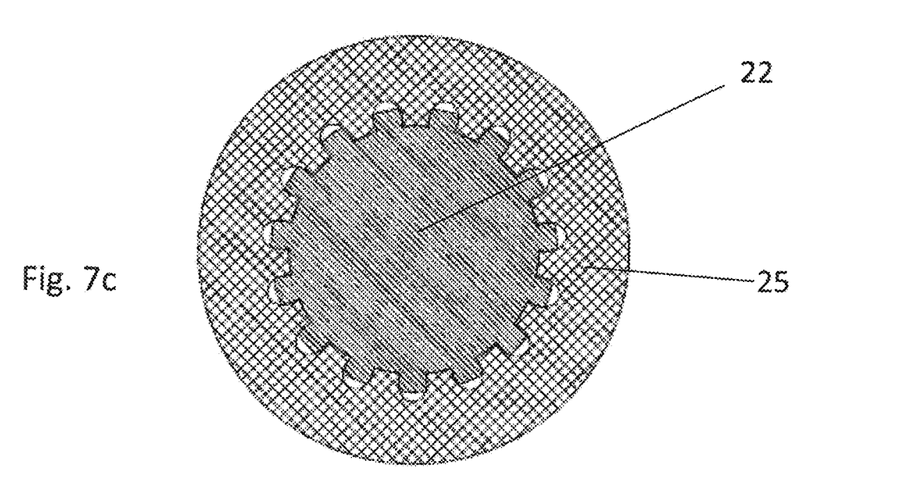
FIG. 7c is a representation of the assembly.

An exemplary embodiment is shown in FIGS. 7*a* through 7*c*. A shaft 22 is provided with dogs 23, between which the interspaces 24 remain. In the shown exemplary embodiment, the dogs 23 comprise an undercut.

The hub 25 shown in FIG. 7*b* comprises corresponding recesses 26 and interspaces or dogs 27.

The result of the combination of FIGS. 7*a* and 7*b* is the image 7*c*, wherein it can be seen that the transmission contacts along the normal are optimized.

The shown exemplary embodiment for example shows a friction ring of a brake disk 25 with respect to a central hub body or caliper 22.

The described exemplary embodiments only serve for explanation and are not limiting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A shaft-hub connection comprising:
 a shaft;
 a hub; and
 an alignment gearing having a plurality of dogs formed on an outer circumferential surface of the shaft or on an inner circumferential surface of the hub,
 wherein the dogs comprise a contour in cross section, which runs, at least partially, along a prolonged trochoid formed along the outer circumferential surface of the shaft or along the inner circumferential surface of the hub.

2. The shaft-hub connection according to claim 1, wherein the prolonged trochoid is a prolonged hypotrochoid.

3. The shaft-hub connection according to claim 1, wherein the prolonged trochoid is a prolonged epitrochoid.

4. The shaft-hub connection according to claim 1, wherein the shaft and the hub can be axially displaced with respect to each other.

5. The shaft-hub connection according to claim 1, wherein the shaft and the hub are pressed together.

6. The shaft-hub connection according to claim 1, wherein at least one of the tooth systems is manufactured by means of non-round turning.

7. The shaft-hub connection according to claim 1, wherein the dogs comprise an undercut.

8. The shaft-hub connection according to claim 1, wherein the alignment gearing comprises stepped areas in the axial direction.

9. The shaft-hub connection according to claim 1 wherein contactless areas are formed in the contour of the dogs.

* * * * *